June 23, 1970  TAKAHISA ONO ET AL  3,517,113
CABLE INSERTION UNIT FOR USE IN ELECTRIC CABLE
JOINT AND TERMINAL
Filed Sept. 30, 1968  2 Sheets-Sheet 1

INVENTORS
TAKAHISA ONO, NOBUO MASUOKA,
MASAYUKI YOSHIOKA, YOSHIO
HAMADA, CHUKI IKEDA, KIMIO SATO,
BY Craig & Antonelli
ATTORNEYS

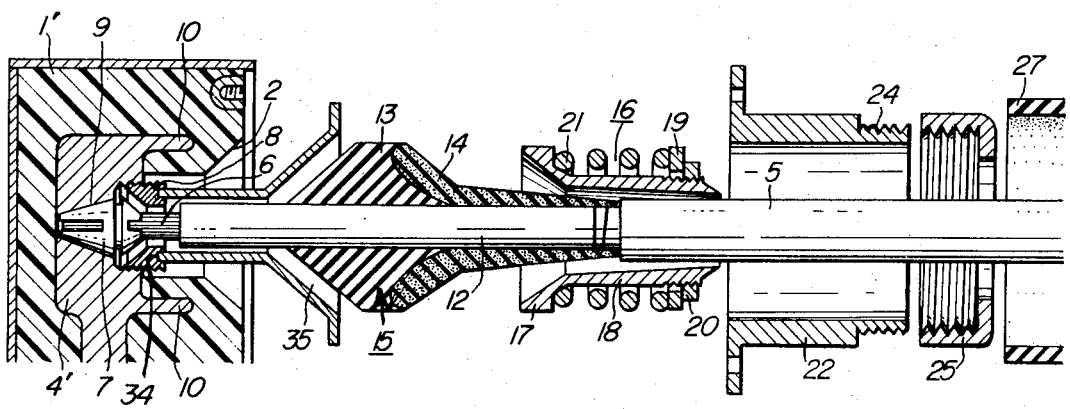
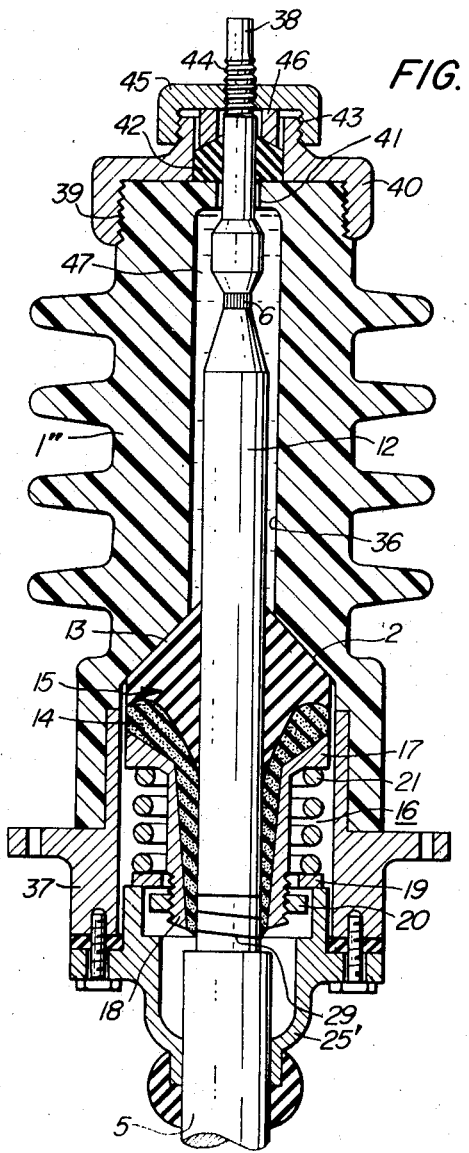

United States Patent Office 3,517,113
Patented June 23, 1970

3,517,113
CABLE INSERTION UNIT FOR USE IN ELECTRIC CABLE JOINT AND TERMINAL
Takahisa Ono, Tokyo, and Nobuo Masuoka, Masayuki Yoshioka, Yoshio Hamada, Chuki Ikeda, and Kimio Sato, Hitachi-shi, Japan, assignors to Hitachi Cable, Ltd., Tokyo, Japan, a corporation of Japan
Filed Sept. 30, 1968, Ser. No. 763,798
Claims priority, application Japan, Oct. 5, 1967, 42/64,266
Int. Cl. H02g 15/04
U.S. Cl. 174—75
3 Claims

ABSTRACT OF THE DISCLOSURE

An electric cable insertion unit having pressing means comprising a tubular pressing element provided with a coil spring bearing portion, a spring backing member slidably mounted on the pressing element, a coil spring compressed between the bearing portion and the backing member, and a supporting element normally supporting the backing member against the force of the coil spring. The pressing means assembled as an integral part is used to force intimately a reinforcing insulation member mounted over a core of the electric cable into a cable insertion opening in an insulator block thereby facilitating assembling and disassembling of a cable joint or cable terminal.

BACKGROUND OF THE INVENTION

Field of the invention

This invention relates to the structure of a cable insertion unit for use in a joint portion and a terminal portion of an electric cable provided with a rubber or plastic insulation, and also to a cable joint and a cable terminal employing such a cable insertion unit.

Description of the prior art

A cable insertion unit which comprises an insulator block having a conical cable insertion opening, and a reinforcing member of electrical insulation of a shape complementary to the shape of the insertion opening is widely employed in a cable joint or cable terminal. In such a cable joint or cable terminal, the reinforcing insulation member is mounted to surround the cable core and is forced into the cable insertion opening to obtain an intimate contact therebetween.

In order to deal with the thermal expansion and contraction due to the heat cycle developed in practical applications, pressing means including a coil spring are incorporated in the cable insertion unit so as to continuously and elastically maintain the state of intimate contact between the insulation block and the reinforcing insulation member engaging the cable insertion opening of the insulator block. The force of thermal expansion and contraction owing to the heat cycle is considerably large, and therefore the coil spring must have a high spring constant which is sufficient to deal with the considerably large force of thermal expansion and contraction.

While the cable insertion unit of the kind described above has a notable feature in its ease of assembling and disassembling, the rapidity with which the cable insertion unit can be assembled and disassembled is a principal requirement in order to make the best use of such a feature.

Cable insertion units of the kind described above have hitherto been proposed in a variety of types. However, in view of the fact that most of these types are invariably based on the structure which resorts to fastening means in the form of nuts and the like, a considerably long period of time is required for the actual assembling and disassembling of the cable insertion unit and the work itself is relatively difficult to do.

Especially, when the coil spring is compressed to force the reinforcing insulation member into intimate contact with the insertion opening of the insulator block, the coil spring in its completely extended state must be compressed by a cap nut which is fastened against the resiliency of the coil spring until the coil spring is compressed to a predetermined dimension. In order to compress the coil spring to such an extent, an extremely large force is required for an operator and the work is continued for a long period of time. Furthermore, the coil spring which is compressed may possibly be manipulated so as to become out of balance, which may cause tools used to be scattered and impart serious damage to the operator. The same problem concerning the coil spring would also arise in the case of disassemble.

SUMMARY OF THE INVENTION

It is therefore an object of the present invention to provide a cable insertion unit which is substantially free from the operation of compressing the coil spring.

Another object of the present invention is to provide a cable insertion unit which can easily be assembled and disassembled with a minimum of labor and in a short time regardless of the relative magnitude of the spring constant of the coil spring.

In order to attain the above objects, the present invention provides a pressing means which comprises a coil spring, a substantially hollow tubular pressing element provided with a coil spring bearing portion at one end thereof, a spring backing member mounted on the said pressing element so as to be slidable in the axial direction of the pressing element, and a supporting element which may be in threaded engagement with the outer periphery of the other end of the pressing element, the coil spring being mounted in its compressed state between the said coil spring bearing portion and the spring backing member. The coil spring in the pressing means imparts its resilient return force to the coil spring bearing portion and to the spring backing member, and the spring backing member is backed up by the supporting element.

A reinforcing member of electrical insulation mounted around the core of an electric cable is brought into intimate contact with a cable insertion opening preferably of conical shape provided in an insulator block. The pressing element of the pressing means is disposed on the reinforcing insulation member, and the spring backing member is engaged with a retaining member which is provided on the insulator block either directly or through another suitable member, the supporting element being urged away from the spring backing member.

Because of the fact that the resilient return force of the coil spring is now exerted between the reinforcing insulation member and the insulator block through the retaining member, the reinforcing insulation member is forced into intimate contact with the cable insertion opening of the insulator block. The above operation does not include the step of compressing the coil spring, and thus the cable insertion unit can completely be assembled with a minimum of labor and in a short working time.

A further object of the present invention is to provide a cable joint which utilizes fully the advantage of the cable insertion unit of the structure described above.

To this end, the insulator block is provided with at least two cable insertion openings for receiving therein the ends of cables to be joined together, and a connecting means for the conductors of the cables is embedded behind the insertion openings in the insulator block.

Another object of the present invention is to provide a cable terminal which utilizes the cable insertion unit of the structure described above. To this end, the insulator block is used as a sleeve, and a conductor lead-out bar is provided in the upper part of the insulator block, the cable insertion opening being disposed in the lower part of the insulator block.

The above and other objects, features and advantages of the present invention will be apparent from the following detailed description of a few preferred embodiments thereof taken in conjunction with the accompanying drawings.

BRIEF DESCRIPTION OF THE DRAWINGS

FIG. 4 is a sectional view of part of another form of the cable joint employing the cable insertion unit according to the present invention.

FIG. 5 is a sectional view of a cable terminal employing the cable insertion unit according to the present invention.

DESCRIPTION OF THE PREFERRED EMBODIMENTS

Figure 1:
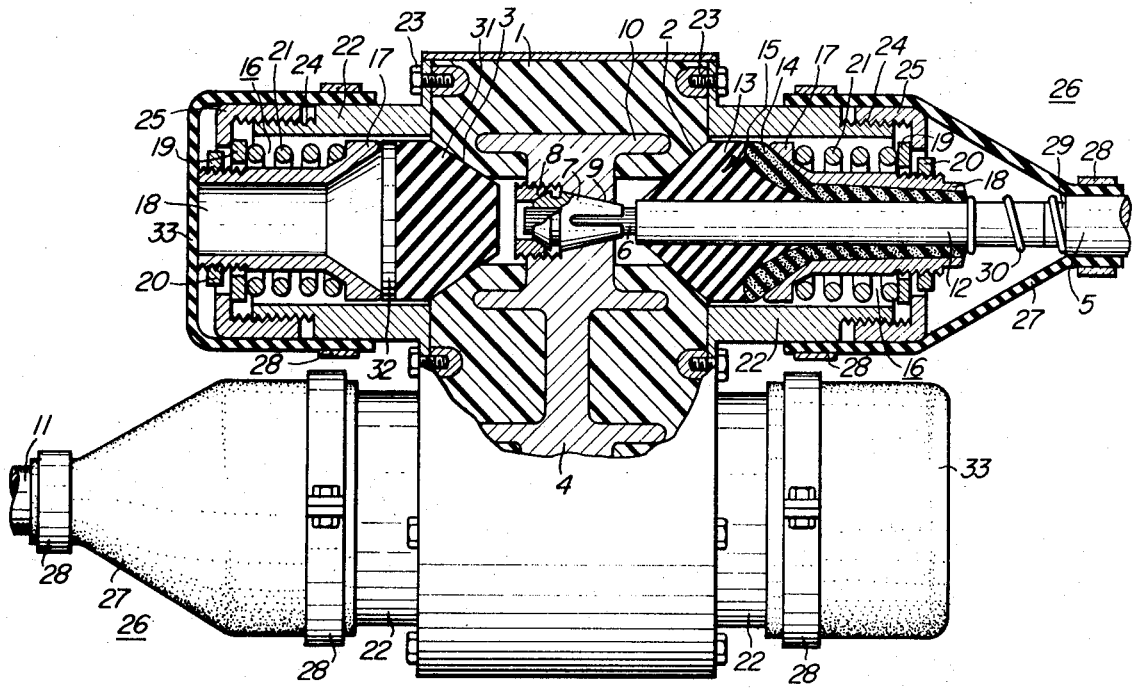
FIG. 1 is a partly sectional front elevational view of a cable joint employing the cable insertion unit according to the present invention.
Figure 2:
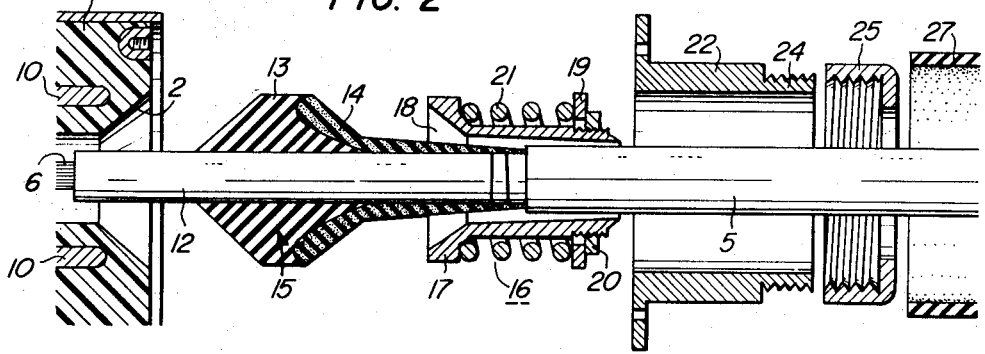
FIG. 2 is a sectional view showing the cable insertion unit in FIG. 1 in its exploded state.
Figure 3:
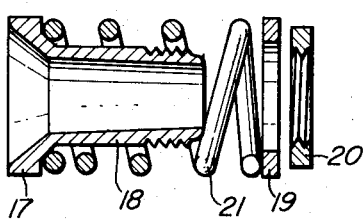
FIG. 3 is a sectional view showing a pressing means in the cable insertion unit in its exploded state.

Referring to FIGS. 1 through 3, there are shown the cable insertion unit according to the present invention and a cable joint employing therein the cable insertion unit. The cable insertion unit comprises an insulator block 1 of material having excellent electrical and mechanical properties such as a synthetic resin or ceramic material. The synthetic resin may be any one of epoxy resin, polyester resin, phenol resin and the like. The insulator block 1 is provided with a conical cable insertion opening 2, and an opening 3 of, for example, the same shape as the insertion opening 2 is formed in the insulator block 1 at a position opposite to the insertion opening 2.

A conductor connecting means 4 which is preferably of copper or its alloy is embedded in the insulator block 1 at a position substantially intermediate between the cable insertion opening 2 and the opening 3 so that it communicates with these openings.

The end of the conductor 6 of an electric cable 5 inserted into the cable insertion opening 2 is secured to the conductor connecting means 4 by the fastening force of means such as a split collar 7 fitted over the periphery of the end of the conductor 6. The fastening force exerted by a fastening nut 8 is imparted to the split collar 7 and coacts with a tapered portion 9 formed in the conductor connecting means 4 to produce a conductor clamping force in the split collar 7 whereby to fix firmly the end of the cable conductor 6 within the conductor connecting means 4.

The conductor connecting means 4 is provided with a shielding ring 10 for relieving the electric field, the shielding ring 10 surrounding the cable conductor 6 and extending at right angles with respect to the axis of the cable 5. This arrangement is effective for reducing the size of the joint in the axial direction of the cable 5. The shape described above is especially preferable in the case of a Y splice.

The end of the conductor of another cable 11 is similarly secured to the conductor connecting means 4. It will thus be understood that the cables 5 and 11 are electrically connected with each other. Although the section on the side of the cable 11 is not shown in FIG. 1, it is to be understood that the detailed structure on that side is the same as that on the side of the cable 5 and the following description with regard to the structure on the side of the cable 5 applies also to the structure on the side of the cable 11.

A reinforcing member of electrical insulation 15 is mounted to surround the cable core 12 having thereon an insulation covering of material such as polyethylene or butyl rubber. The reinforcing insulation member 15 is in the form of a molded body comprising an insulation layer 13 of electrically insulating material of a relatively resilient nature such as natural rubber or synthetic rubber and an overlying semiconductive layer 14 of a material such as the one obtained by uniformly dispersing powder of a conductive substance such as acetylene carbon black into rubber or of plastic material.

The semiconductive layer 14 forming part of the reinforcing insulation member 15 is electrically connected with the external shielding layer on the cable 5 and thus acts as a stress cone. However, the structure of the reinforcing insulation member 15 is not limited to that illustrated herein. For example, a stress cone of copper or aluminum may be disposed at the boundary between the insulation layer 13 and the semiconductive layer 14, and the semiconductive layer 14 may be made from the same material as that of the insulation layer 13, thereby eliminating the semiconductive layer 14.

The reinforcing insulation member 15 is preliminarily assembled over the cable core 12 as shown in FIG. 2, and a preliminarily prepared pressing means 16 is assembled over the reinforcing insulation member 15. The pressing means 16 comprises a hollow tubular pressing element 18 which is provided with a coil spring bearing portion 17 at one end thereof and is adapted to be assembled over the reinforcing insulation member 15 including its layer 14 or equivalent structure, a spring backing member 19 mounted on the pressing element 18 so as to be slidable in the axial direction of the pressing element 18, a supporting element 20 in threaded engagement with the outer periphery of the other end of the pressing element 18, and a coil spring 21 of spring steel or stainless steel disposed in its compressed state between the coil spring bearing portion 17 and the spring backing member 19. Before being assembled over the reinforcing insulation member 15, the pressing means 16 is preassembled as an integral part as shown in FIG. 2 and is assembled over the cable 5 with its coil spring 21 in a compressed state. The pressing means 16 is shown in its disassembled condition in FIG. 3, from which it will be seen that the coil spring 21 is in its decompressed condition so that one of its ends projects beyond the corresponding end of the pressing element 18.

The length of the coil spring 21 in its extended state is not specifically limited except for the sole requirement that, when the coil spring 21 is disposed in its compressed state assembled in the pressing means 16 in the manner shown in FIG. 2, the resilient return force acts between the coil spring bearing portion 17 and the spring backing member 19 so that the spring backing member 19 is supported by the supporting element 20.

A metal material such as copper or brass is commonly used to form the pressing element 18, the spring backing member 19 and the supporting element 20, and the pressing means 16 is commonly pre-assembled as an integral part in the factory. Thus, it is to be noted that the pressing means 16 is supplied and handled as an integral assembly in which the coil spring 21 has already been preset in its compressed state.

Referring to FIG. 1, the reference numeral 22 designates a cylindrical member which is secured by bolts 23 to the peripheral edge of the cable insertion opening 2 of the insulator block 1. The cylindrical member 22 may be detached from the insulator block 1 and preliminarily assembled over the cable 5 as seen in FIG. 2 when it is convenient. The cylindrical member 22 is threaded as at 24 at one end thereof for threaded engagement with a retaining member 25 in the form of a cap nut as seen in FIG. 1. The retaining member 25 is also preliminarily assembled over the cable 5 as shown in FIG. 2. Thus, the retaining member 25 is indirectly secured to the insulator block 1 through the cylindrical member 22. In another form, the cylindrical member 22 may be replaced by an axial cylindrical extension of the insulator block 1 so that the retaining member 25 may be directly provided to the insulator block 1.

When the retaining member 25 is so mounted on or fastened to the cylindrical member 22, the spring backing member 19 in the pressing means 16 having its pressing element 18 mounted over the reinforcing insulation member 15 surrounding the cable core 12 is in engagement with the retaining member 25 as seen in FIG. 1 and is urged a slight distance away from the supporting element 20, with the result that the spring backing member 19 is now supported by the retaining member 25. Accordingly, the resilient return force of the coil spring 21 acts now between the insulator block 1 and the reinforcing insulation member 15 by way of the retaining member 25 and the cylindrical member 22 so that the reinforcing insulation member 15 is resiliently forced by the coil spring 21 into intimate contact with the cable insertion opening 2 of the insulator block 1, thereby constituting the desired cable insertion unit which is generally designated by the reference numeral 26.

The setting up of the cable insertion unit 26 can very easily and safely be carried out, because the steps involved therein comprise preparing the pressing means 16 which has been preliminarily assembled in the factory as an integral part including the coil spring 21 preset in its compressed state, assembling the pressing means 16 over the reinforcing insulation member 15 mounted about the cable core 12 so that the spring backing member 19 is engageable with the retaining member 25, and fastening the retaining member 25 for moving the spring backing member 19 away from the supporting element 20 so that the reinforcing insulating member 15 can be forced into the desired intimate contact with the cable insertion opening 2 of the insulator block 1 by the resilient return force of the coil spring 21. Therefore, the prior art manipulation of compressing the fully extended coil spring to a predetermined dimension becomes utterly unnecessary, and a minimum of labor and a very short working time will be required according to the present invention to achieve a safe operation. In lieu of resorting to the fastening force of the retaining member 25 for urging the spring backing member 19 away from the supporting element 20, the retaining member 25 may be brought into engagement with the spring backing member 19 and then the supporting element 20 may be urged away from the spring backing member 19 to attain the same result as above.

The reference numeral 27 designates a cover of rubber or like material which extends over the cylindrical member 22 and the cable 5 in order to provide a watertight covering as required. The cover 27 is fastened and held in place by a plurality of bands 28. A tin-plated copper wire 30 provided on the cable core 12 electrically connects the semiconductive layer 14 of the reinforcing insulation member 15 with a shielding layer 29 on the cable 5 so that the semiconductive layer 14 can function as a stress cone.

The opening 3 is provided so as to facilitate the operation of fixing the end of the cable conductor 6 to the conductor connecting means 4. A suitable tool is inserted through this opening 3 to fasten the fastening nut 8 thereby clamping the end of the conductor 6 by the split collar 7 to fix the conductor 6 to the conductor connecting means 4 as described already.

After the end of the cable conductor 6 has been fixed to the conductor connecting means 4, a plug 31 of rubber, plastic or like electrical insulator is engaged with the opening 3 for the sake of electrical security. Simple means may be employed to securely fix the plug 31 in the opening 3, but in FIG. 1, a pressing means 16 of the same construction as that employed in the cable insertion unit 26 is used.

A cylindrical member 22 surrounding the pressing means 16 is connected with the insulator block 1 by bolts 23 and has a threaded portion 24 which is in threaded engagement with a retaining member 25. The pressing means 16 is mounted within the cylindrical member 22 between the retaining member 25 and a collar 32 bearing against the plug 31, the spring backing member 19 disengaged from the supporting element 20 being engaged with the retaining member 25 so that the resilient return force of the coil spring 21 acts between the insulator block 1 and the plug 31 through the retaining member 25 and the cylindrical member 22. The above action of the coil spring 21 forces the plug 31 into intimate contact with the opening 3. A cap 33 may be securely mounted on the cylindrical member 22 by a band 28 in order to provide a watertight covering as required.

An arrangement similar to the above is provided on the corresponding side of the cable 11. However, it will be apparent from FIG. 1 that the cable insertion unit 26 on the side of the cable 11 is disposed symmetrically with respect to the cable insertion unit 26 on the side of the cable 5. This is reasonable inasmuch as the cables 5 and 11 are jointed to each other along the longitudinal direction thereof.

A very simple procedure can release the resiliency of the coil spring 21 imparted to the reinforcing insulation member 15. The supporting element 20 may merely be fastened to urge the spring backing member 19 away from the retaining member 25 so that the resilient return force of the coil spring 21 can now act between the coil spring bearing portion 17 and the spring backing member 19 which is now backed up by the supporting element 20. The coil spring 21 is thereby set in its compressed state within the pressing means 16, and the cable insertion unit can be disassembled to the state shown in FIG. 2 with substantial freedom from sensing the resiliency of the coil spring 21. The manipulation for disassembling can thus easily and safely be performed.

A procedure similar to the above may be followed for the removal of the plug 31 out of the opening 3. After the plug 31 has been removed, the fastening nut 8 is unfastened from the opening 3 to release the clamping force of the split collar 7 imparted to the cable conductor 6 thereby releasing the cable conductor 6 from the conductor connecting means 4.

FIG. 4 illustrating an application of the cable insertion unit of the present invention to another form of cable joint will lend itself to an understanding of a variety of possible applications of the present invention. In FIG. 4, like reference numerals are used to denote like parts appearing in FIGS. 1 through 3. It will be understood therefore that the previous description given with reference to FIGS. 1 through 3 applies to the structure shown in FIG. 4 insofar as the parts carry the same reference numerals.

A marked difference between the structure in FIG. 4 and that in FIG. 1 is that the cable insertion unit in the former comprises an insulator block 1' which is not provided with the opening 3 although it has a cable insertion opening 2. Accordingly, a split collar 7 and a fastening nut 8 in a conductor connection means 4' are manipulated through the cable insertion opening 2 in contrast to the case of FIG. 1.

A rubber cover 27, a retaining member 25, a cylindrical member 22, a pressing means 16 and a reinforcing insulation member 15 are preliminarily assembled over the core 12 of a cable 5, and the end of the cable 5 is inserted into the cable insertion opening 2. The split collar 7 mounted over the end of the cable conductor 6 is subject to the fastening force imparted by the fastening nut 8 and acts to clamp the end of the conductor 6 in cooperation with a tapered portion 9 in the conductor connecting means 4'.

An end of a manipulating tool 35 used to fasten the fastening nut 8 has a plurality of projections engageable with a plurality of corresponding recesses 34 in the fastening nut 8. Although not illustrated in FIG. 4, the manipulating tool 35 consists of two elements which is able to split into halves longitudinally so that it can freely be disassembled from the cable core 12. Thus, the fastening nut 8 can be fastened by turning the manipulating tool 35 about the axis of the cable 5. After the end of the cable conductor 6 has been secured to the conductor connecting means 4', the manipulating tool 35 is disassembled, and the reinforcing insulation member 15, the pressing means 16, the cylindrical member 22, the retaining member 25 and the rubber cover 27 are integrally assembled in a manner as shown in FIG. 1 according to the procedure described with reference to FIG. 1.

A typical structure of a cable terminal employing the cable insertion unit according to the present invention is shown in FIG. 5, in which like reference numerals are used to denote like parts appearing in FIG. 1.

An insulator block 1" which is commonly designated as sleeve or bushing is provided with a conical cable insertion opening 2 at one or lower end thereof. An internal passage 36 communicating with the cable insertion opening 2 extends axially through the insulator block 1". A lower member 37 of cylindrical shape is secured to the lower part of the insulator block 1" in such a manner as to surround the peripheral edge of the cable insertion opening 2. The lower member 37 is used, for example, when the entire cable terminal is fixed to a pole.

A reinforcing insulation member 15 comprising an insulation layer 13 and an overlying semiconductive layer 14 is mounted about the core 12 of a cable 5, and a pressing element 18 of a pressing means 16 is assembled over the reinforcing insulation member 15. A coil spring 21 is held in its compressed state by being supported at one end thereof by a coil spring bearing portion 17 of the pressing element 18 and at the other end thereof by a retaining member 25 through a spring backing member 19 so that its resilient return force acts between the reinforcing insulation member 15 and the retaining member 25 which is bolted to the lower member 37. As a result, the reinforcing insulation member 15 is forced by the resiliency of the coil spring 21 into intimate contact with the cable insertion opening 2, thereby constituting the cable insertion unit.

The cable 5 has its external shielding layer 29 electrically connected with the semiconductive layer 14, which serves thus as a stress cone. A conductor lead-out bar 38 of copper is press-fitted or otherwise fixed to the end of the cable conductor 6. An upper member 40 having a central perforation is in threaded engagement with a threaded portion 39 at the upper part of the insulator block 1", and the conductor lead-out bar 38 extends outwardly from the internal passage 36 within the insulator block 1" through an upper central perforation 41 of the insulator block 1" and through the central perforation of the upper member 40.

A packing 42 of rubber or like material is interposed between the upper member 40 and the lead-out bar 38. A cap nut 45 which is in threaded engagement with the upper member 40 and with the lead out bar 38 with the respective threaded portions 43 and 44 thereof imparts a fastening force to the packing 42 through a collar 46 thereby fixing the conductor lead-out bar 38 in watertight relation. A fluid insulating compound 47 such as silicone oil or polybutene may be filled into the space defined between the internal passage 36 of the insulator block 1" and the cable core 12 when so required.

In assembling the cable terminal, the retaining member 25 is assembled over the cable 5. The reinforcing insulation member 15 is then assembled over the cable core 12, and the pressing means 16 assembled as an integral pre-assembled part by having the coil spring 21 set compressed between the coil spring bearing portion 17 and the spring backing member 19 supported by the supporting element 20, is mounted on the cable core 12. The cable core 12 is then inserted into the internal passage 36 through the cable insertion opening 2 until the pressing element 18 of the pressing means 16 is disposed over the reinforcing insulation member 15, and the retaining member 25 is then bolted to the lower member 37. When the retaining member 25 is so secured to the lower member 37, the upper end of the retaining member 25 engages and forces the spring backing member 19 upwardly to urge the spring backing member 19 away from the supporting element 20 as shown. Thus, the resilient return force of the spring 21 acts now between the insulator block 1" and the reinforcing insulation member 15 through the retaining member 25 and the lower member 37, thereby completing the cable insertion unit.

The lead-out bar 38 may be connected with the cable conductor 6 before the cable core 12 is inserted into the internal passage 36 of the insulator block 1". As for the mounting of the upper member 40, the cap nut 45, the packing 42 and other elements, no description will be necessary for those skilled in the art.

The filling of the insulating compound 47 may, for example, be made at the time of inserting the core 12 into the internal passage 36. It will be readily apparent that the cable terminal can easily be disassembled by the steps which are the reverse of the assembling steps described above.

It will be understood that many changes and modifications may be made in the present invention without departing from the scope of the present invention defined in the appended claims.

What is claimed is:

1. An electric cable insertion unit, comprising pressing means including a hollow tubular pressing element provided with a coil spring bearing portion at one end thereof, a spring backing member mounted on said pressing element so as to be slidable in the axial direction of said pressing element, a coil spring mounted in its compressed state between said coil spring bearing portion and said spring backing member, and a supporting element engaging the other end of said pressing element so as to normally support said spring backing member against the resilient return force of said coil spring, an insulator block having a cable insertion opening, an electric cable whose core is inserted into said cable insertion opening, a reinforcing insulation member mounted over said core and forced into intimate contact with said cable insertion opening with said pressing element in said pressing means assembled over the periphery thereof, and a retaining member provided on said insulator block and engageable with said spring backing member in the state in which said spring backing member and said supporting element are spaced apart relative to each other thereby supporting said spring backing member by said retaining member in place of said supporting element.

2. A joint for electric cables, comprising pressing means including a hollow tubular pressing element provided with a coil spring bearing portion at one end thereof, a spring backing member mounted on said pressing element so as to be slidable in the axial direction of said pressing element, a coil spring mounted in its compressed state between said coil spring bearing portion and said spring backing member, and a supporting element engaging the other end of said pressing element so as to normally support said spring backing member against the resilient return force of said coil spring, an insulator block having at least two cable insertion openings for receiving therein the cores of individual electric cables having conductors, said cable insertion openings communicating with a conductor connecting means embedded within said insulator block so that the conductors of the electric cables can be connected with each other and fixed in place by said conductor connecting means, a reinforcing insulation member mounted over each of said cores and forced into intimate contact with a respective one said cable insertion openings with a corresponding pressing element in said pressing means assembled over the periphery thereof, and a retaining member provided on said insulator block at a location corresponding to each of said cable insertion opening, a retaining member being engageable with a respective spring backing member in the state in which said spring backing member and the coresponding supporting element are spaced apart relative to each other thereby supporting said spring backing member by said retaining member in place of by said supporting element.

3. An electric cable terminal, comprising pressing means including a hollow tubular pressing element provided with a coil spring bearing portion at one end thereof, a spring backing member mounted on said pressing element so as to be slidable in the axial direction of said pressing element, a coil spring mounted in its compressed state between said coil spring bearing portion and said spring backing member, and a supporting element engaging the other end of said pressing element so as to normally support said spring backing member against the resilient return force of said coil spring, an insulator block having a cable insertion opening at one end thereof and formed thereinside with an internal passage communicating with said cable insertion opening, an electric cable having a conductor whose core is inserted into said internal passage through said cable insertion opening, an electrically conducting lead-out bar connected at one end thereof with the end of the conductor of said cable and projecting at the other end thereof outwardly from the other end of said insulator block, a reinforcing insulation member mounted over said core and forced into intimate contact with said cable insertion opening with said pressing element assembled over the periphery thereof, and a retaining member provided on said insulator block and engageable with said spring backing member in the state in which said spring backing member and said supporting element are spaced apart relative to each other thereby supporting said spring backing member by said retaining member in place of by said supporting element.

References Cited
UNITED STATES PATENTS

| | | | |
|---|---|---|---|
| 2,700,140 | 1/1955 | Phillips | 339—94 |
| 2,740,098 | 3/1956 | Phillips | 339—94 |

MARVIN A. CHAMPION, Primary Examiner

J. H. McGLYNN, Assistant Examiner

U.S. Cl. X.R.

174—19, 73; 339—94, 103